(12) United States Patent  
Wang

(10) Patent No.: US 6,985,356 B2  
(45) Date of Patent: Jan. 10, 2006

(54) ROTATABLE DISPLAY MOUNTING STRUCTURE

(75) Inventor: Wen-Chieh Wang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 31 days.

(21) Appl. No.: 10/750,768

(22) Filed: Jan. 5, 2004

(65) Prior Publication Data

US 2005/0099765 A1  May 12, 2005

(30) Foreign Application Priority Data

Nov. 7, 2003 (TW) .............................. 92219811 U

(51) Int. Cl.
*G06F 1/16* (2006.01)

(52) U.S. Cl. .................... 361/683; 312/223.2; 248/920

(58) Field of Classification Search ........ 361/679–687, 361/729; 364/708.1; 439/23, 25, 28, 31; 248/917–923; 312/223.2

See application file for complete search history.

(56) References Cited

U.S. PATENT DOCUMENTS

| 5,268,817 A | * | 12/1993 | Miyagawa et al. ......... 361/681 |
| 5,559,670 A | * | 9/1996 | Flint et al. .................. 361/681 |
| 6,504,707 B2 | * | 1/2003 | Agata et al. ................ 361/681 |
| 2005/0063145 A1 | * | 3/2005 | Homer et al. ............... 361/683 |

* cited by examiner

*Primary Examiner*—Hung Van Duong  
(74) *Attorney, Agent, or Firm*—Bacon & Thomas, PLLC

(57) ABSTRACT

A rotatable display mounting structure is disclosed to include a hollow frame, a display pivotally mounted inside the hollow frame, positioning structures provided at the display, positioning devices formed in the hollow frame and adapted to engage with the positioning structures and to hold the display in the hollow frame in position after rotation of the display in the hollow frame vertically (or horizontally). The positioning structures are respectively extended from the outer left side of the display to the outer right side of the display, and the positioning devices are respectively extended from the left-side frame bar of the hollow frame to the right-side frame bar of the hollow frame, so that the positioning structures and the positioning devices, when matched, form a shielding structure to stop light from passing through the gap between the display and the hollow frame.

6 Claims, 4 Drawing Sheets

ROTATABLE DISPLAY MOUNTING STRUCTURE

BACKGROUND OF THE INVENTION

1. Field of the Invention

The present invention relates to a display mounting structure and, more particularly, to a rotary display mounting structure used in a portable computer.

2. Description of Related Art

Following fast development of computer industry and the related technology, a variety of computers, including desktop computers, notebook computers, tablet PCs (personal computers), and etc. have been created and commercialized.

A conventional notebook computer or tablet PC has the display mounted in a frame. In an early design, the display is directly affixed to the frame, and not rotatable relative to the frame. Recently, rotatable displays are commonly used in portable computers. The so-called rotatable display is to have the display fastened pivotally with the frame by means of pivot holes and pivots. However, conventional rotatable display mounting designs do not have means to hold the display positively in position after a rotary motion. Further, in order to let the display be rotatable in the frame, a gap is left between the display and the frame. Due to the presence of the gap, the display can be freely rotated in the frame without interference. However, the gap admits light from the back side of the portable computer to pass through and may interfere with the user's sight.

Therefore, it is desirable to provide a rotatable display mounting structure that eliminates the aforesaid drawbacks.

SUMMARY OF THE INVENTION

The present invention has been accomplished under the circumstances in view. It is the main object of the present invention to provide a rotatable display mounting structure, which enables the display to be selectively positioned in one of two reversed positions and, which blocks external back light when set in position.

According to the first embodiment of the present invention, the rotatable display mounting structure comprises a hollow frame, and a display. The hollow frame comprises a left-side frame bar, a right-side frame bar, a top frame bar, a bottom frame bar, a mounting space surrounded by the left-side frame bar, the right-side frame bar, the top frame bar and the bottom frame bar, and two first pivoting devices coaxially provided in the respective middle positions of the left-side frame bar and the right-side frame bar. The display is mounted within the mounting space inside the hollow frame, comprising an outer left side, an outer right side, an outer top side and an outer bottom side respectively disposed corresponding to the left-side frame bar, right-side frame bar, top frame bar and bottom frame bar of the hollow frame, and two second pivoting devices coaxially provided in the respective middle positions of the outer left side and the outer right side and respectively pivoted to the first pivoting devices of the hollow frame to secure the display to the hollow frame for enabling the display to be turned about the axis passing through the first pivoting devices and the second pivoting devices Further, the display comprises at least one positioning structure disposed at at least one of the outer top side and outer bottom side of the display; the hollow frame comprises at least one positioning device disposed at at least one of the top frame bar and bottom frame bar of the hollow frame and adapted to engage with the at least one positioning structure of the display for positioning. When rotating the display in the hollow frame, the at least one positioning structure and the at least one positioning device can be matched to hold the display in position.

The at least one positioning structure is respectively extended from the outer left side of the display to the outer right side of the display, and the at least one positioning device is respectively extended from the left-side frame bar of the hollow frame to the right-side frame bar of the hollow frame, so that the at least one positioning structure and the at least one positioning device, when matched, form a shielding structure to stop light from passing through the gap between the display and the hollow frame.

According to the second embodiment of the invention, the rotatable display mounting structure comprises a hollow frame, and a display. The hollow frame comprises a left-side frame bar, a right-side frame bar, a top frame bar, a bottom frame bar, a mounting space surrounded by the left-side frame bar, the right-side frame bar, the top frame bar and the bottom frame bar, and two first pivoting devices coaxially provided in the respective middle positions of the top frame bar and the bottom frame bar. The display is mounted within the mounting space inside the hollow frame, comprising an outer left side, an outer right side, an outer top side and an outer bottom side respectively disposed corresponding to the left-side frame bar, right-side frame bar, top frame bar and bottom frame bar of the hollow frame, and two second pivoting devices coaxially provided in the respective middle positions of the outer top side and the outer bottom side and respectively pivoted to the first pivoting devices of the hollow frame to secure the display to the hollow frame for enabling the display to be turned about the axis passing through the first pivoting devices and the second pivoting devices. Further, the display comprises at least one positioning structure disposed at at least one of the outer left side and outer right side of the display; the hollow frame comprises at least one positioning device disposed at at least one of the left-side frame bar and right-side frame bar of the hollow frame and adapted to engage with the at least one positioning structure of the display for positioning. When rotating the display in the hollow frame, the at least one positioning structure and the at least one positioning device can be matched to hold the display in position.

DETAILED DESCRIPTION OF THE PREFERRED EMBODIMENT

Figure 1:
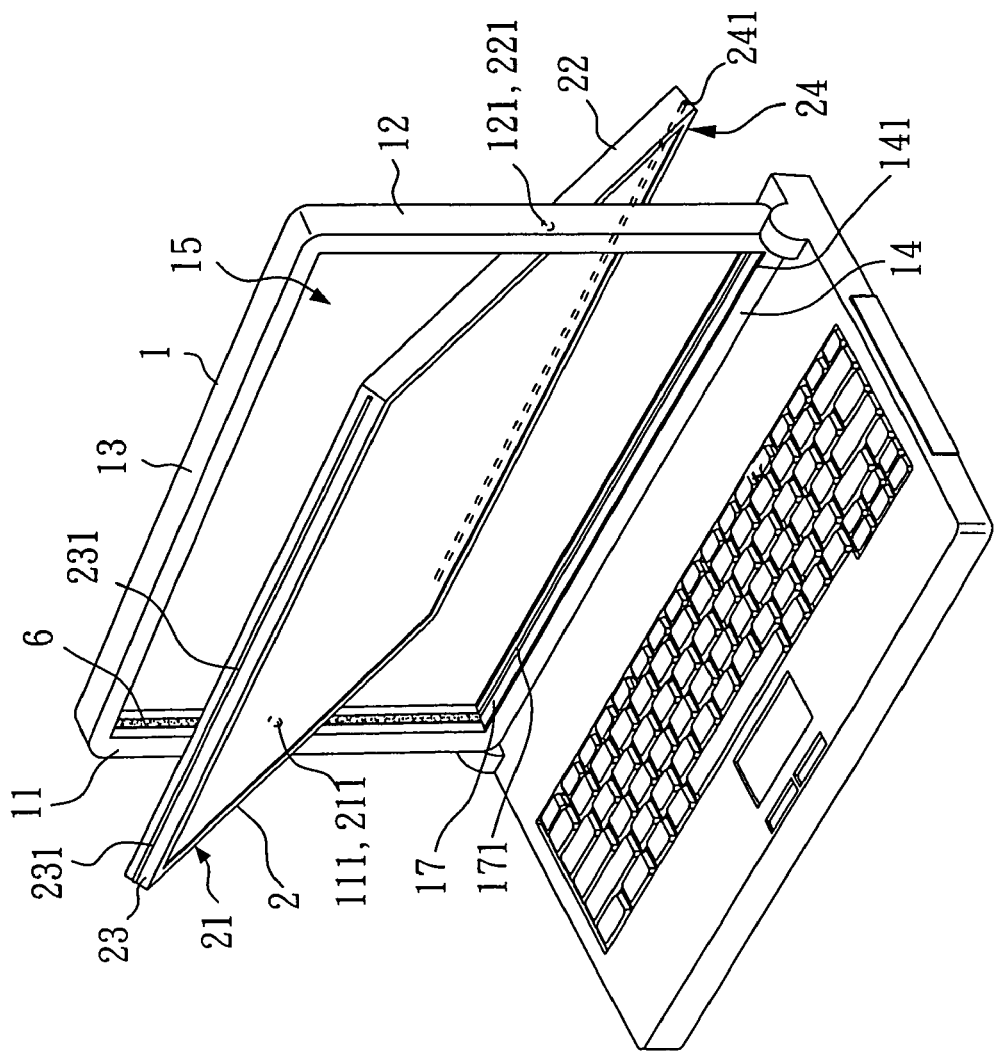
FIG. 1 is a perspective of the first embodiment of the present invention.
Figure 2:
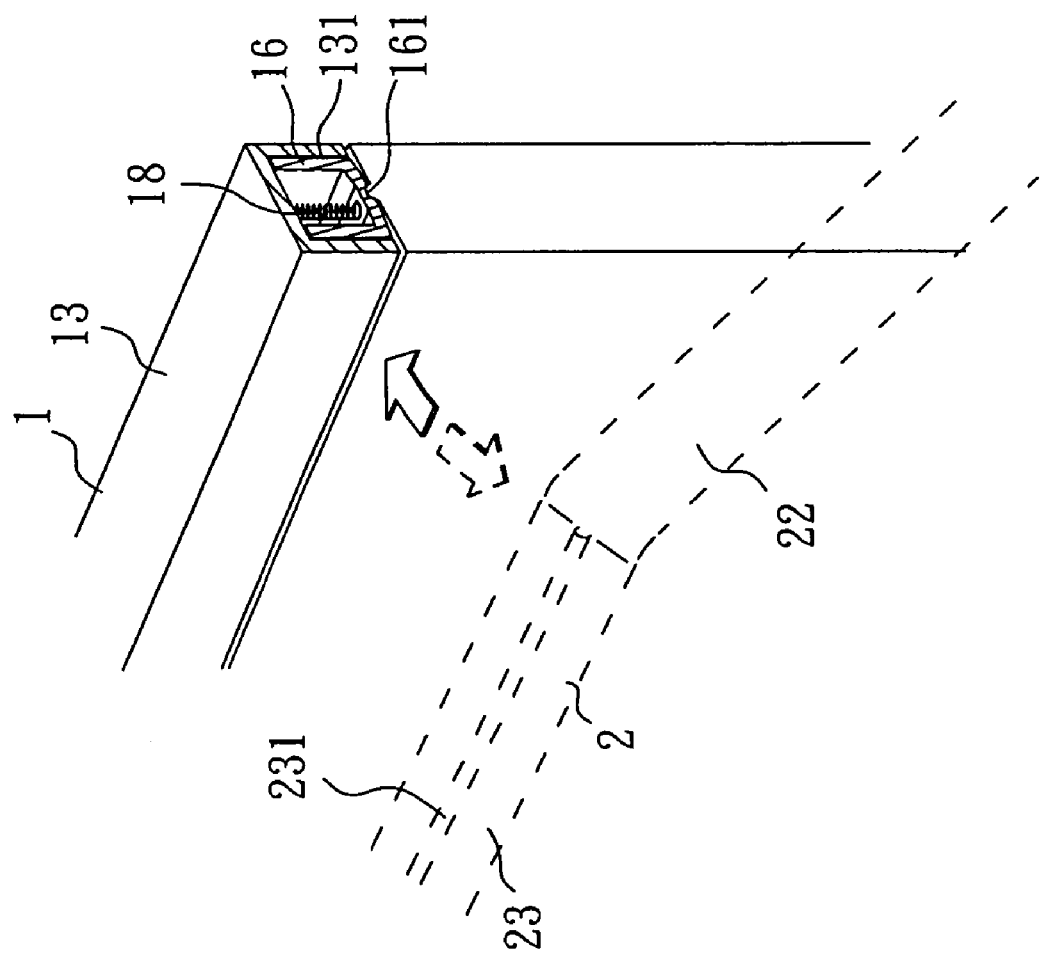
FIG. 2 is an enlarged view of a part of the first embodiment of the present invention.

Referring to FIGS. 1 and 2, a rotatable display mounting structure is shown comprising a hollow frame 1. The hollow frame 1 has a left-side frame bar 11, a right-side frame bar 12, a top frame bar 13, and a bottom frame bar 14. The frame bars 11~14 surrounds a mounting space 15. Two first pivoting devices 111 and 121 are coaxially provided in the respective middle positions of the left-side frame bar 11 and the right-side frame bar 12.

As illustrated, a display 2 is mounted within the mounting space 15 inside the hollow frame 1. The display 2 has an outer left side 21, an outer right side 22, an outer top side 23, and an outer bottom side 24. The outer sides 21~24 correspond to the frame bars 11~14 of the hollow frame 1 respectively. Two second pivoting devices 211 and 221 are coaxially provided in the respective middle positions of the outer left side 21 and the outer right side 22 and respectively pivoted to the first pivoting devices 111 and 121 to secure the display 2 to the hollow frame 1, enabling the display 2 to be turned about the axis passing through the first pivoting devices 111 and 121 and the second pivoting devices 211 and 221. According to this embodiment, the first pivoting devices 111 and 121 and the second pivoting devices 211 and 221 are pivot holes and pivots (alternatively, the first pivoting devices 111 and 121 and the second pivoting devices 211 and 221 can be pivots and pivot holes).

As illustrated in FIGS. 1 and 2, the display 2 further has two flange-like positioning structures 231 and 241 respectively disposed at the outer top side 23 and the outer bottom side 24. The hollow frame 1 further comprises two locating grooves 131 and 141 respectively formed in the top frame bar 13 and the bottom frame bar 14 at an inner side, a plurality of spring members, for example, compression springs 18 respectively mounted inside the locating grooves 131 and 141, and two positioning bars 16 and 17 respectively supported on the spring members 18 in the locating grooves 131 and 141. The positioning bars 16 and 17 each have a groove-like positioning device 161 or 171 disposed at an outer side.

When rotating the display 2 within the hollow frame 1, the positioning bars 16 and 17 are forced outwards by the spring members 18 toward the inside of the mounting space 15 within the hollow frame 1, for enabling the respective groove-like positioning devices 161 and 171 to receive the flange-like positioning structures 231 and 241 and to further hold the display 2 in the hollow frame 1 in position. Further, the, flange-like positioning structures 231 and 241 respectively extend from the outer left side 21 to the outer right side 22, and the groove-like positioning devices 161 and 171 respectively extend from the left-side frame bar 11 to the right-side frame bar 12. When the flange-like positioning structures 231 and 241 and the groove-like positioning devices 161 and 171 were matched, they form an elongated light shield to stop light from passing through the gap between the display 2 and the hollow frame 1, and therefore when the user viewing the display 2, the external light does not interfere with the user's sight.

The aforesaid groove and flange (tongue) coupling arrangement between the positioning devices 161 and 171 and positioning structures 231 and 241 may be interchanged; the spring members 18 may be provided at the positioning structures 231 and 241 and adapted to shorten the distance between the positioning devices 161 and 171 and the positioning structures 231 and 241, causing the positioning structures 231 and 241 to engage with the positioning devices 161 and 171 respectively. Further, sponges 6 may be installed in the left-side frame bar 11 and the right-side frame bar 12, and adapted to shield the gap between the left-side frame bar 11 and right-side frame bar 12 of the hollow frame 1 and the outer left side 21 and outer right side 22 of the display 2, achieving a light-shading effect.

Figure 3:
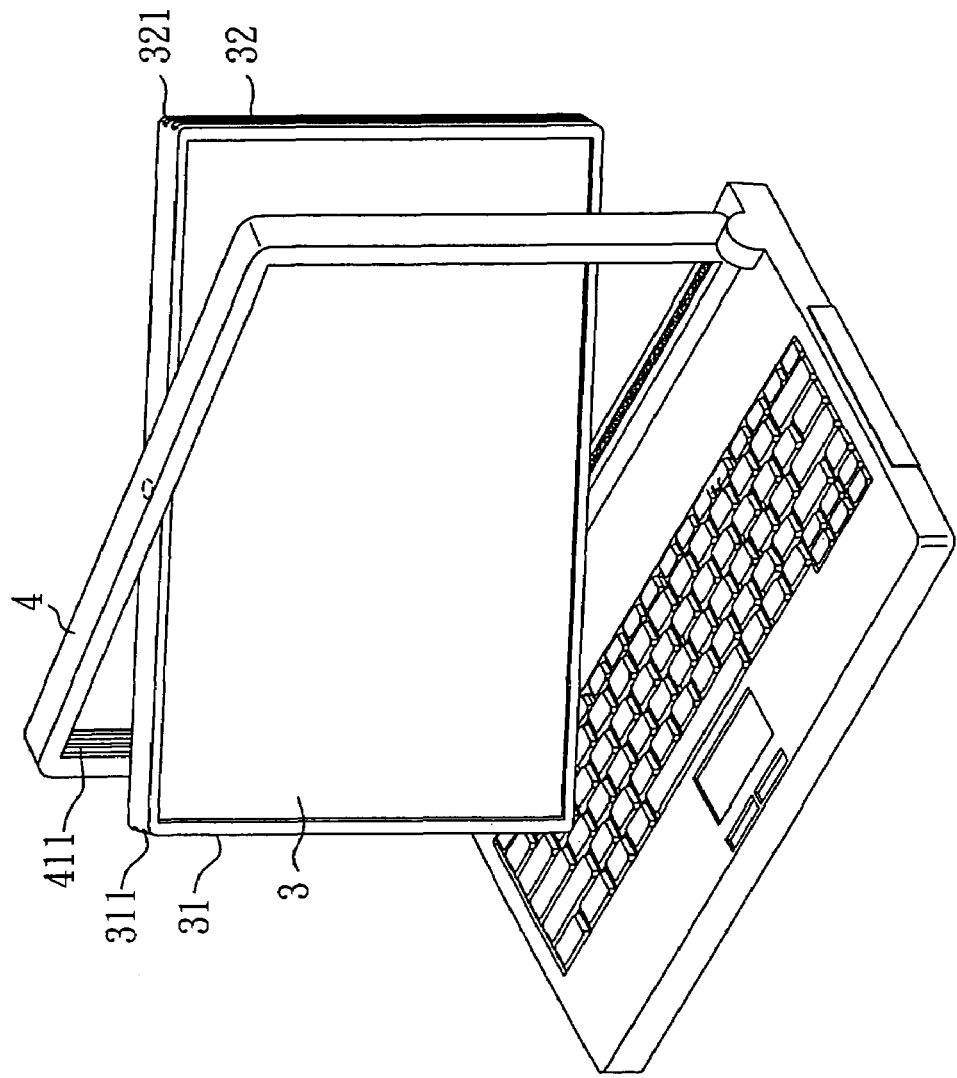
FIG. 3 is a perspective view of the second embodiment of the present invention.
Figure 4:
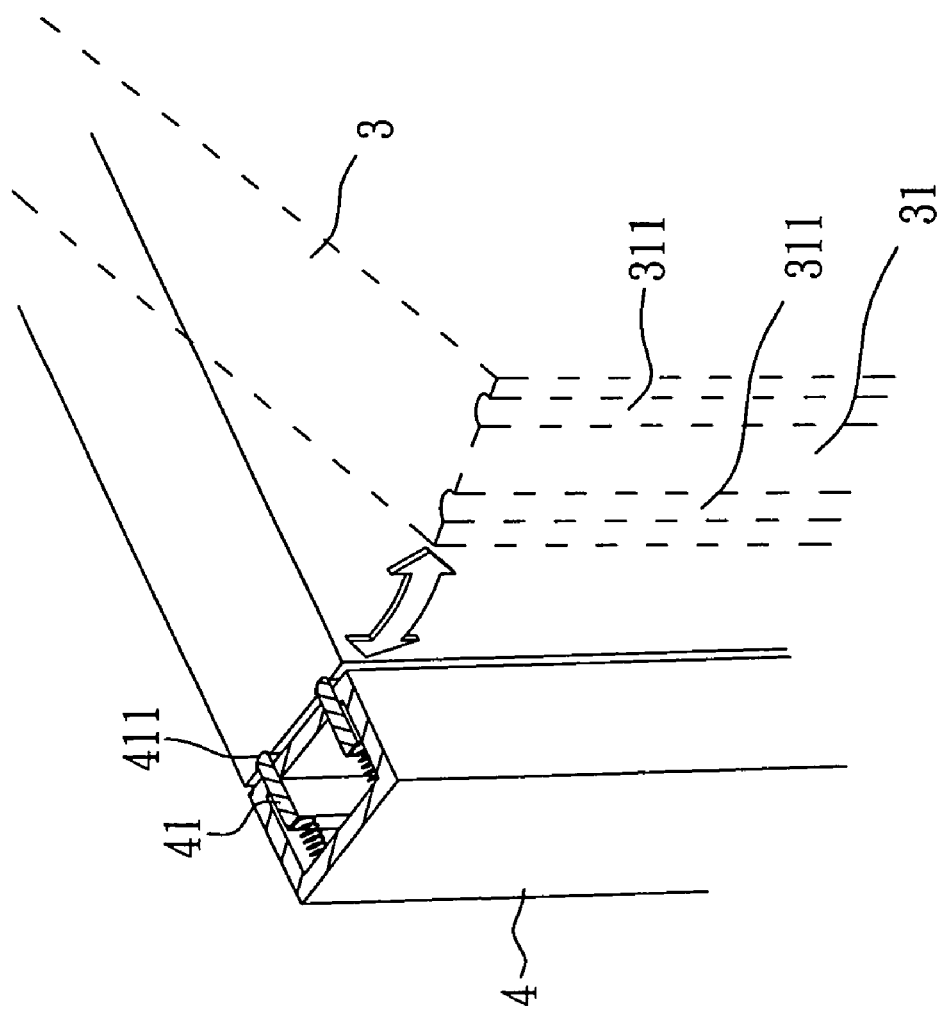
FIG. 4 is an enlarged view of a part of the second embodiment of the present invention.

FIGS. 3 and 4 show a rotatable display mounting structure according to the second embodiment of the present invention. This embodiment is substantially similar to the aforesaid first embodiment with the exception of the direction of rotation of the display. According to the aforesaid first embodiment, the display 2 is rotatable in the hollow frame 1 in vertical direction (see FIG. 1); according to this second embodiment, the display 3 is rotatable in the hollow frame 4 in horizontal direction. Same as the aforesaid first embodiment, the display 3 and the hollow frame 4 are pivoted together by means of pivot holes and pivots.

Further, the positioning structures 311 and 321 of the display 3 are two elongated grooves respectively formed in the outer left side 31 and the outer right side 32; the positioning devices 411 of the hollow frame 4 are two elongated flanges (tongues) respectively formed on two respective locating plates 41 respectively corresponding to the elongated grooves of the positioning structures 311 and 321 of the display 3.

A prototype of rotatable display mounting structure has been constructed with the features of FIGS. 1~4. The rotatable display mounting structure functions smoothly to provide all of the features discussed earlier.

Although particular embodiments of the present invention have been described in detail for purposes of illustration, various modifications and enhancements may be made without departing from the spirit and scope of the invention. Accordingly, the invention is not to be limited except as by the appended claims.

What is claimed is:

1. A rotatable display mounting structure comprising:
   a hollow frame, said hollow frame comprising a left-side frame bar, a right-side frame bar, a top frame bar, a bottom frame bar, a mounting space surrounded by said left-side frame bar, said right-side frame bar, said top frame bar and said bottom frame bar, and two first pivoting devices coaxially provided in the respective middle positions of said left-side frame bar and said right-side frame bar;
   a display mounted within said mounting space inside said hollow frame, said display comprising an outer left side, an outer right side, an outer top side and an outer bottom side respectively disposed corresponding to the left-side frame bar, right-side frame bar, top frame bar and bottom frame bar of said hollow frame, and two second pivoting devices coaxially provided in the respective middle positions of said outer left side and said outer right side and respectively pivoted to the first pivoting devices of said hollow frame to secure said display to said hollow frame for enabling said display to be turned about an axis passing through said first pivoting devices and said second pivoting devices;
   wherein said display comprises at least one positioning structure disposed at at least one of the outer top side and outer bottom side of said display; said hollow frame comprises at least one positioning device disposed at at least one of the top frame bar and bottom frame bar of said hollow frame and adapted to engage with the at least one positioning structure of said display for positioning.
   and at least one spring member adapted to impart a pressure to one of the at least one positioning structure of said display and the at least one positioning device of said hollow frame to shorten the distance between the at least one positioning structure of said display and the at least one positioning device of said hollow frame.

2. The rotatable display mounting structure as claimed in claim 1, wherein the at least one positioning structure of said display and the at least one positioning device of said hollow frame form a tongue and groove joint.

3. The rotatable display mounting structure as claimed in claim 1, wherein said hollow frame has at least one groove formed in at least one of the top frame bar and bottom frame bar of said hollow frame, said groove adapted to receive said at least one spring member; each positioning device of said hollow frame being formed in an outer side of a respective elongated locating bar, said elongated locating bar being received in the at least one groove of said hollow frame and being supported by the at least one spring member to impart the pressure toward the inside of said mounting space.

4. A rotatable display mounting structure comprising:

a hollow frame, said hollow frame comprising a left-side frame bar, a right-side frame bar, a top frame bar, a bottom frame bar, a mounting space surrounded by said left-side frame bar, said right-side frame bar, said top frame bar and said bottom frame bar, and two first pivoting devices coaxially provided in the respective middle positions of said top frame bar and said bottom frame bar;

a display mounted within said mounting space inside said hollow frame, said display comprising an outer left side, an outer right side, an outer top side and an outer bottom side respectively disposed corresponding to the left-side frame bar, right-side frame bar, top frame bar and bottom frame bar of said hollow frame, and two second pivoting devices coaxially provided in the respective middle positions of said outer top side and said outer bottom side and respectively pivoted to the first pivoting devices of said hollow frame to secure said display to said hollow frame for enabling said display to be turned about an axis passing through said first pivoting devices and said second pivoting devices;

wherein said display comprises at least one positioning structure disposed at at least one of the outer left side and outer right side of said display; said hollow frame comprises at least one positioning device disposed at at least one of the left-side frame bar and right-side frame bar of said hollow frame and adapted to engage with the at least one positioning structure of said display for positioning;

and at least one spring member adapted to impart a pressure to one of the at least one positioning structure of said display and the at least one positioning device of said hollow frame to shorten the distance between the at least one positioning structure of said display and the at least one positioning device of said hollow frame.

5. The rotatable display mounting structure as claimed in claim 4, wherein the at least one positioning structure of said display and the at least one positioning device of said hollow frame form a tongue and groove joint.

6. The rotatable display mounting structure as claimed in claim 4, wherein said hollow frame has at least one groove formed in at least one of the left-side frame bar and right-side frame bar of said hollow frame and adapted to receive said at least one spring member; each positioning device of said hollow frame being formed in an outer side of a respective elongated locating bar, said elongated locating bar being received in the at least one groove of said hollow frame and being supported by the at least one spring member to impart the pressure toward the inside of said mounting space.

* * * * *